United States Patent
Khoshnevisan et al.

(10) Patent No.: US 11,044,683 B2
(45) Date of Patent: Jun. 22, 2021

(54) DUAL-LOOP UPLINK POWER CONTROL FOR URLLC HARQ TRANSMISSIONS

(71) Applicant: QUALCOMM Incorporated, San Diego, CA (US)

(72) Inventors: Mostafa Khoshnevisan, San Diego, CA (US); Farhad Meshkati, San Diego, CA (US); Peerapol Tinnakornsrisuphap, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/270,322

(22) Filed: Feb. 7, 2019

(65) Prior Publication Data

US 2019/0253988 A1    Aug. 15, 2019

Related U.S. Application Data

(60) Provisional application No. 62/629,665, filed on Feb. 12, 2018.

(51) Int. Cl.

| | |
|---|---|
| *H04W 52/10* | (2009.01) |
| *H04W 52/48* | (2009.01) |
| *H04W 52/14* | (2009.01) |
| *H04W 52/20* | (2009.01) |
| *H04W 52/18* | (2009.01) |

(Continued)

(52) U.S. Cl.
CPC .......... *H04W 52/48* (2013.01); *H04L 1/1812* (2013.01); *H04W 52/10* (2013.01); *H04W 52/12* (2013.01); *H04W 52/146* (2013.01); *H04W 52/18* (2013.01); *H04W 52/20* (2013.01);

(Continued)

(58) Field of Classification Search
CPC ..... H04W 52/08; H04W 52/10; H04W 52/12; H04W 52/146; H04W 52/18; H04W 52/20; H04W 52/241; H04W 52/48; H04W 72/0406; H04L 1/1812; H04L 1/1816; H04L 1/1819
See application file for complete search history.

(56) References Cited

U.S. PATENT DOCUMENTS

| | | | |
|---|---|---|---|
| 2005/0283663 A1 | 12/2005 | Frederiksen et al. | |
| 2006/0252445 A1* | 11/2006 | Kim ..................... | H04L 1/1812 455/522 |

(Continued)

FOREIGN PATENT DOCUMENTS

WO    2018084996 A1    5/2018

OTHER PUBLICATIONS

International Search Report and Written Opinion—PCT/US2019/017179—ISA/EPO—dated Apr. 24, 2019.

*Primary Examiner* — Philip Sobutka
(74) *Attorney, Agent, or Firm* — Harrity & Harrity, LLP (57) ABSTRACT

Various aspects of the present disclosure generally relate to wireless communication. In some aspects, a user equipment may receive a first set of power control parameters and a second set of power control parameters; transmit a first transmission based at least in part on the first set of power control parameters; and transmit a second transmission based at least in part on the second set of power control parameters, wherein the second transmission is a retransmission of the first transmission. Numerous other aspects are provided.

30 Claims, 6 Drawing Sheets

(51) Int. Cl.
*H04L 1/18* (2006.01)
*H04W 52/12* (2009.01)
*H04W 52/24* (2009.01)
*H04W 72/04* (2009.01)
*H04W 52/08* (2009.01)

(52) U.S. Cl.
CPC .......... *H04W 52/241* (2013.01); *H04W 52/08* (2013.01); *H04W 72/0406* (2013.01)

(56) References Cited

U.S. PATENT DOCUMENTS

| | | |
|---|---|---|
| 2014/0161060 A1 | 6/2014 | Nam et al. |
| 2016/0227486 A1* | 8/2016 | Park .................... H04W 72/042 |
| 2018/0192416 A1* | 7/2018 | Yin .................. H04W 72/0413 |
| 2018/0310257 A1* | 10/2018 | Papasakellariou .... H04W 52/50 |

* cited by examiner

DUAL-LOOP UPLINK POWER CONTROL FOR URLLC HARQ TRANSMISSIONS

CROSS-REFERENCE TO RELATED APPLICATIONS UNDER 35 U.S.C. § 119

This application claims priority to Provisional Patent Application No. 62/629,665, filed on Feb. 12, 2018, entitled "TECHNIQUES AND APPARATUSES FOR DUAL-LOOP UPLINK POWER CONTROL FOR ULTRA-RELIABLE LOW LATENCY COMMUNICATIONS HARQ TRANSMISSIONS," which is hereby expressly incorporated by reference herein.

FIELD OF THE DISCLOSURE

Aspects of the present disclosure generally relate to wireless communication, and more particularly to techniques and apparatuses for dual-loop uplink power control for ultra-reliable low latency communications (URLLC) hybrid automatic repeat request (HARQ) transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) may include receiving a first set of power control parameters and a second set of power control parameters; transmitting a first transmission based at least in part on the first set of power control parameters; and transmitting a second transmission based at least in part on the second set of power control parameters, wherein the second transmission is a retransmission of the first transmission.

In some aspects, a UE for wireless communication may include memory and one or more processors operatively coupled to the memory. The memory and the one or more processors may be configured to receive a first set of power control parameters and a second set of power control parameters; transmit a first transmission based at least in part on the first set of power control parameters; and transmit a second transmission based at least in part on the second set of power control parameters, wherein the second transmission is a retransmission of the first transmission.

In some aspects, a non-transitory computer-readable medium may store one or more instructions for wireless communication. The one or more instructions, when executed by one or more processors of a UE, may cause the one or more processors to receive a first set of power control parameters and a second set of power control parameters; transmit a first transmission based at least in part on the first set of power control parameters; and transmit a second transmission based at least in part on the second set of power control parameters, wherein the second transmission is a retransmission of the first transmission.

In some aspects, an apparatus for wireless communication may include means for receiving a first set of power control parameters and a second set of power control parameters; means for transmitting a first transmission based at least in part on the first set of power control parameters; and means for transmitting a second transmission based at least in part on the second set of power control parameters, wherein the second transmission is a retransmission of the first transmission.

In some aspects, a method of wireless communication performed by a base station may include determining a first set of power control parameters for a first transmission and a second set of power control parameters for a second transmission, wherein the second transmission is a retransmission of the first transmission, wherein the first set of power control parameters are determined based at least in part on a first power control loop and the second set of power control parameters are determined based at least in part on a second power control loop different than the first power control loop; and transmitting information identifying the first set of power control parameters and the second set of power control parameters.

In some aspects, a base station for wireless communication may include memory and one or more processors operatively coupled to the memory. The memory and the one or more processors may be configured to determine a first set of power control parameters for a first transmission and a second set of power control parameters for a second transmission, wherein the second transmission is a retransmission of the first transmission, wherein the first set of power control parameters are determined based at least in part on a first power control loop and the second set of power control parameters are determined based at least in part on a second power control loop different than the first power control loop; and transmit information identifying the first set of power control parameters and the second set of power control parameters.

In some aspects, a non-transitory computer-readable medium may store one or more instructions for wireless communication. The one or more instructions, when executed by one or more processors of a base station, may cause the one or more processors to determine a first set of power control parameters for a first transmission and a second set of power control parameters for a second transmission, wherein the second transmission is a retransmission of the first transmission, wherein the first set of power control parameters are determined based at least in part on a first power control loop and the second set of power control parameters are determined based at least in part on a second power control loop different than the first power control loop; and transmit information identifying the first set of power control parameters and the second set of power control parameters.

In some aspects, an apparatus for wireless communication may include means for determining a first set of power control parameters for a first transmission and a second set of power control parameters for a second transmission, wherein the second transmission is a retransmission of the first transmission, wherein the first set of power control parameters are determined based at least in part on a first power control loop and the second set of power control parameters are determined based at least in part on a second power control loop different than the first power control loop; and means for transmitting information identifying the first set of power control parameters and the second set of power control parameters.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
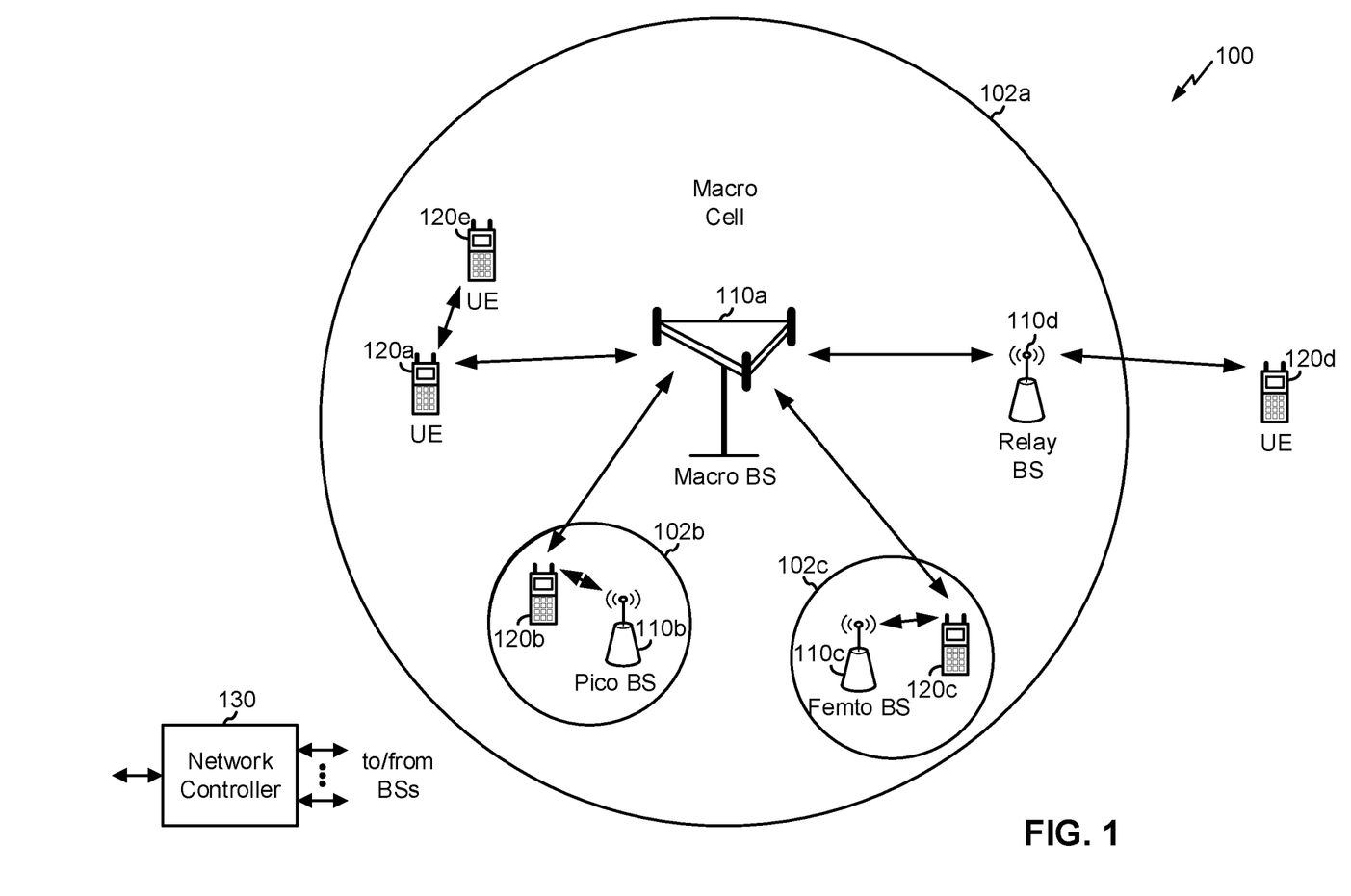
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with UEs and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples may differ from what is described with regard to FIG. 1.

Figure 2:
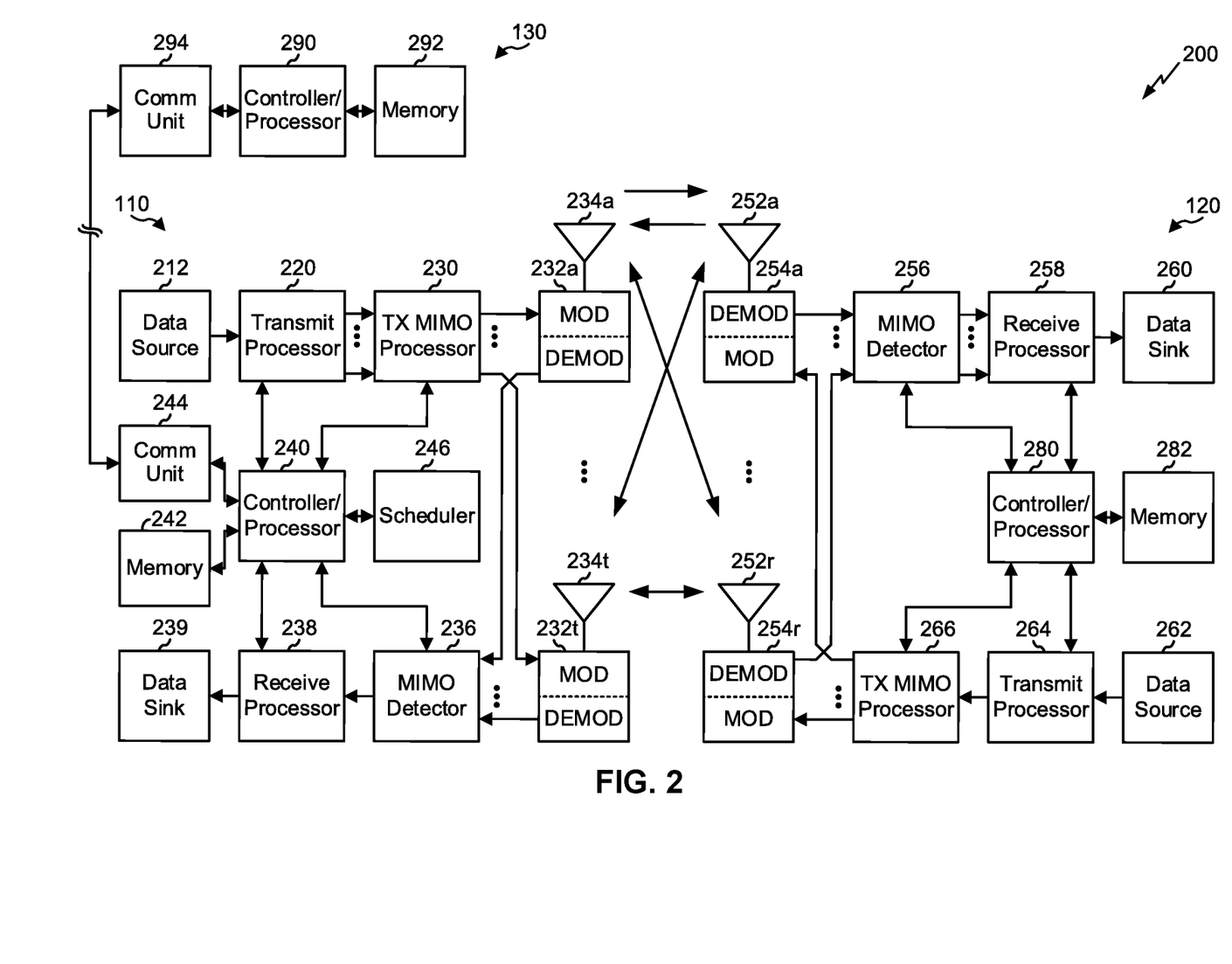
FIG. 2 is a block diagram conceptually illustrating an example of a base station in communication with a UE in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general $T \geq 1$ and $R \geq 1$.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292. In some aspects, one or more components of UE 120 may be included in a housing.

Controller/processor 240 of BS 110, controller/processor 280 of UE 120, and/or any other component(s) of FIG. 2 may perform one or more techniques associated with dual-loop uplink power control for URLLC HARQ transmissions, as described in more detail elsewhere herein. For example, controller/processor 240 of BS 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for receiving a first set of power control parameters and a second set of power control parameters; means for transmitting a first transmission based at least in part on the first set of power control parameters; means for transmitting a second transmission based at least in part on the second set of power control parameters; means for determining a first transmit power of the first transmission and a second transmit power of the second transmission based at least in part on the first set of power control parameters and the second set of power control parameters, respectively; means for tracking a first transmit power of the first transmission separately from a second transmit power of the second transmission; and/or the like. In some aspects, such means may include one or more components of UE 120 described in connection with FIG. 2.

In some aspects, BS 110 may include means for determining a first set of power control parameters for a first transmission and a second set of power control parameters for a second transmission; means for transmitting information identifying the first set of power control parameters and the second set of power control parameters; means for determining a first outer loop link adaptation (OLLA) value for the first transmission and a second OLLA value for the second transmission; and/or the like. In some aspects, such means may include one or more components of BS 110 described in connection with FIG. 2.

As indicated above, FIG. 2 is provided merely as an example. Other examples may differ from what is described with regard to FIG. 2.

5G/NR may provide for URLLC communications. URLLC imposes stringent packet error rate (PER) requirements (e.g., 1e-4 to 1e-6) with low latency (e.g., 0.5 ms to 10 ms). The HARQ procedure is used to achieve URLLC reliability requirements. Due to the low latency requirements, the number of HARQ retransmissions that can be used is limited (e.g., to a maximum of 1-2 retransmissions).

In order to achieve the total PER and delay requirements while maximizing capacity for URLLC, it may be beneficial to target different block error rates (BLERs) for a first transmission and for one or more retransmissions of the first transmission. For example, to achieve a PER of 10e-6, the BS 110 may target a BLER of 10e-2 for the first HARQ transmission, and may target a BLER of 10e-4 for a second HARQ transmission (e.g., a retransmission of the first HARQ transmission). In general, it is beneficial to be more conservative (in terms of the targeted BLER) for retransmissions as the delay deadline draws closer with each retransmission.

A BS may configure a UE for power control using an open loop power control (OLPC) configuration and/or a closed loop power control (CLPC) configuration. In an OLPC configuration, the BS may transmit power control parameters for OLPC (e.g., P_0_PUSCH, alpha, etc.) to the UE (e.g., using radio resource control (RRC)), and the UE may determine a transmit power for a physical uplink shared channel (PUSCH) based at least in part on the power control parameters and a number of allocated resources for the UE. In a CLPC configuration, the BS may transmit a transmit power control (TPC) command to the UE (e.g., using downlink control information) on a control channel. The TPC command may be added to or subtracted from the transmit power that was determined using OLPC. TPC commands sent by the BS can be based at least in part on a signal to interference plus noise ratio (SINR) target or another target.

Some techniques and apparatuses described herein provide for configuration of power control (e.g., OLPC and/or CLPC) separately for a first transmission and a second transmission, wherein the second transmission is a retransmission of the first transmission. For example, some techniques and apparatuses described herein may target different SINRs for the first transmission and the second transmission by maintaining two different uplink power control loops and sets of power control parameters at the BS, and may transmit two different sets of power control parameters to the UE for the first transmission and the second transmission. Some techniques and apparatuses described herein may transmit two different TPC commands to the UE for CLPC. The UE may apply the power control parameters and TPC commands with regard to the appropriate transmission, of the first transmission or the second transmission.

In this way, separate power control loops can be maintained for the first transmission and for the second transmission. Thus, a transmission power offset (either fixed or non-fixed) between the first transmission and the second transmission can be provided. This, in turn, may improve reliability of URLLC HARQ communications and enable more accurate targeting of respective BLERs for the first transmission and the second transmission. Thus, transmission and processor resources are conserved that would otherwise be wasted in association with additional retransmissions for poorly targeted HARQ communications.

The techniques and apparatuses described herein are described primarily in the context of a first transmission and a second transmission for simplicity. However, the techniques and apparatuses described herein can be applied with regard to any number of retransmissions. For example, the BS may maintain respective power loops for a transmission and for each retransmission of the transmission, and may perform the appropriate signaling as described herein. This may provide the benefit of increased granularity of control over transmission power of each retransmission, thus enabling different BLER targets for different retransmissions.

Figure 3A:
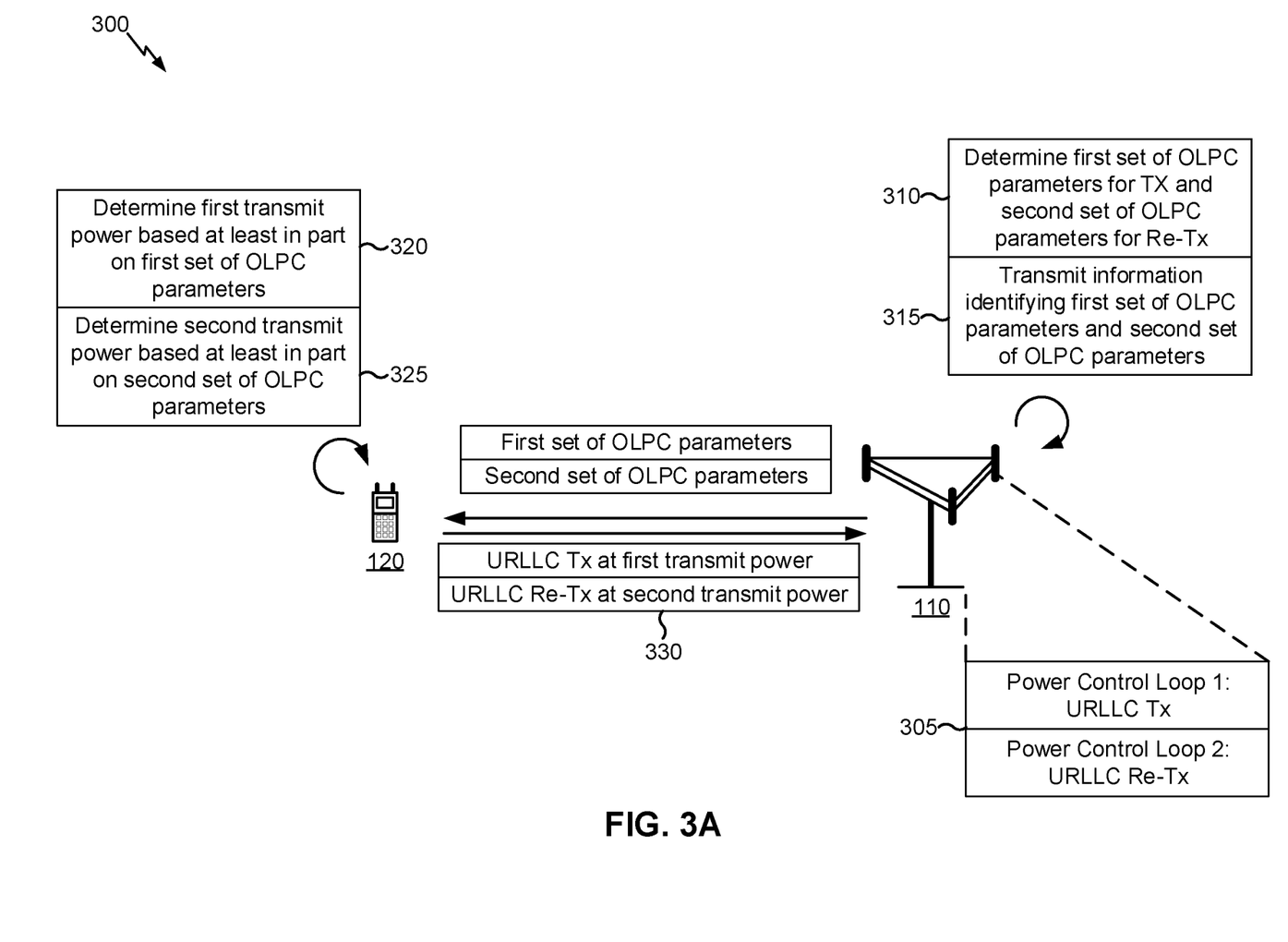
FIGS. 3A and 3B are diagrams illustrating examples of open-loop power control (OLPC) and closed-loop power control (CLPC) using multiple power control loops for URLLC HARQ transmissions, in accordance with various aspects of the present disclosure.
Figure 3B:
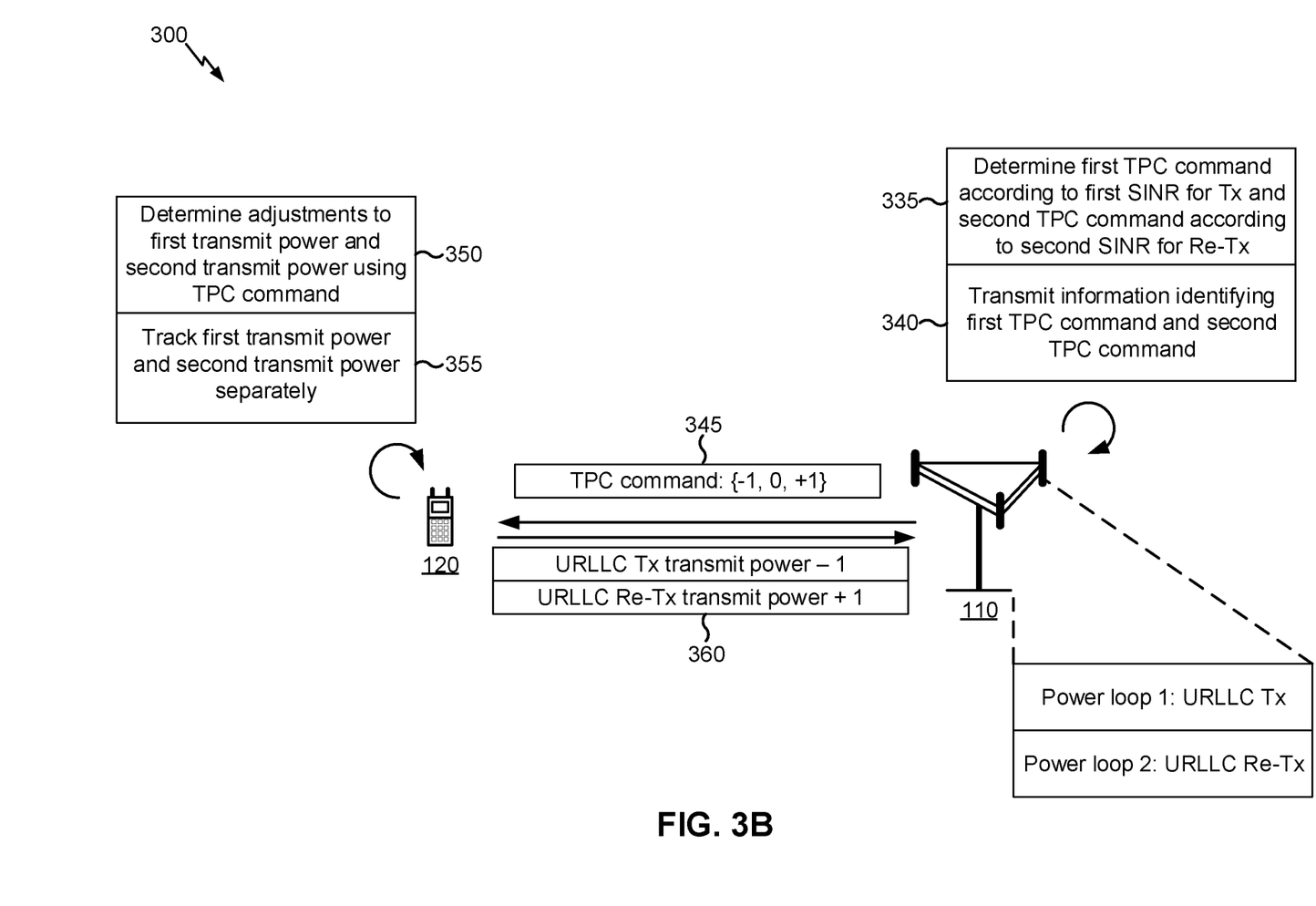

FIGS. 3A and 3B are diagrams illustrating examples 300 of OLPC and CLPC using multiple power loops for URLLC HARQ transmissions, in accordance with various aspects of the present disclosure.

As shown in FIG. 3A, and by reference number 305, a BS 110 may be associated with a first power control loop (e.g., Power Control Loop 1) and a second power control loop (e.g., Power Control Loop 2). As further shown, the first power control loop may be for a first transmission (e.g., a first URLLC HARQ transmission, shown as URLLC Tx or Tx in FIGS. 3A and 3B) and the second power control loop may be for a second transmission (e.g., a second URLLC HARQ transmission that is a retransmission of the first URLLC HARQ transmission, shown as URLLC Re-Tx or Re-Tx in FIGS. 3A and 3B). For example, the BS 110 may determine power control parameters (e.g., OLPC parameters and/or CLPC parameters) for the first transmission separately from power control parameters for the second transmission. In this way, the BS 110 may target different signal to interference plus noise ratio (SINR) targets, different block error rate (BLER) targets, and/or like for the first transmission in comparison to the second transmission. This improves reliability of URLLC transmissions and allows more granular targeting of BLER targets, SINR targets, and/or the like for different transmissions.

As shown by reference number 310, the BS 110 may determine a first set of OLPC parameters (e.g., power control parameters) for the first transmission and a second set of OLPC parameters for the second transmission. For example, the BS 110 may determine the first set of OLPC parameters using the first power control loop, and may determine the second set of OLPC parameters using the second power control loop. In some aspects, the first set of OLPC parameters may be different than the second set of OLPC parameters. For example, the first set of OLPC parameters and the second set of OLPC parameters may be configured to provide a fixed offset (e.g., a fixed delta) between a transmit power of the first transmission and a transmit power of the second transmission. In some aspects, an OLPC parameter may include a PO value, an alpha value, and/or the like, as described in more detail in 3GPP Technical Specification 36.213.

In some aspects, the BS 110 may determine an OLPC parameter based at least in part on a BLER or PER target, an SINR target, and/or the like. For example, the first transmission may be associated with a first reliability requirement and the second transmission may be associated with a second reliability requirement higher than the first reliability requirement. Thus, in some aspects, the BS 110 may determine OLPC parameters that cause a transmit power of the second transmission to be higher than a transmit power of the first transmission.

As shown by reference number 315, the BS 110 may transmit information identifying the first set of OLPC parameters and the second set of OLPC parameters to the UE 120. For example, the BS 110 may provide a message (e.g., a radio resource control (RRC) message to configure the UE 120 to implement the first set of OLPC parameters and the second set of OLPC parameters. However, techniques and apparatuses described herein are not limited to RRC messaging, and the information identifying the first set of OLPC parameters and/or the second set of OLPC parameters may be provided using any messaging format or any type of transmission.

As shown by reference number 320, the UE 120 may determine a first transmit power based at least in part on the first set of OLPC parameters, and, as shown by reference number 325, the UE 120 may determine a second transmit power based at least in part on the second set of OLPC parameters. For example, the UE 120 may determine the first transmit power and the second transmit power based at least in part on the first set of OLPC parameters, the second set of OLPC parameters, and resource allocations associated with the first transmission and the second transmission. The first transmit power may be a transmit power of the first transmission, and the second transmit power may be a transmit power of the second transmission.

As shown by reference number 330, the UE 120 may transmit the first transmission at the first transmit power and may transmit the second transmission at the second transmit power. For example, the second transmit power may be higher than the first transmit power. This may improve likelihood of success of the second transmission, thereby improving reliability of URLLC HARQ transmissions.

FIG. 3B shows an example of CLPC for a first transmission and a second transmission. As shown in FIG. 3B, the BS 110 may be associated with the first power control loop for the first transmission and the second power control loop for the second transmission, as described above in connection with FIG. 3A. Thus, the BS 110 may determine CLPC parameters (e.g., a power control parameter, such as a TPC command and/or the like) separately for the first transmission and the second transmission. Similarly, the UE 120 may apply the CLPC parameters separately for the first transmission and the second transmission.

As shown in FIG. 3B, and by reference number 335, the BS 110 may determine a first TPC command according to a first SINR target for the first transmission (e.g., Tx), and may determine a second TPC command according to a second SINR target for the second transmission (e.g., Re-Tx). For example, the BS 110 may determine a first TPC value (e.g., a transmit power increase or decrease value) for the first transmission using the first power control loop, and may determine a second TPC value for the second transmission using the second power control loop. In some aspects, the first TPC command and the second TPC command may be configured to achieve different SINR targets associated with the respective transmissions. Using separate TPC commands for the first transmission and the second transmission may provide more granular control of an offset or difference between transmit powers of the first transmission and the second transmission. For example, the BS 110 may configure a dynamic offset (e.g., a non-fixed delta) between transmit powers of the first transmission and the second transmission. In such a case, the BS 110 may configure transmit power control values or TPC commands to achieve the dynamic offset between the transmit powers.

As shown by reference number 340, the BS 110 may transmit information identifying the first TPC command and the second TPC command (e.g., the first set of power control parameters and the second set of power control parameters) to the UE 120. In some aspects, when a power control value (e.g., a TPC value, a CLPC parameter, a power control parameter, etc.) is not to change for a particular transmission, the BS 110 may not transmit a TPC command for the particular transmission. This may save processing and radio resources that would otherwise be used to transmit such a command indicating no change.

As shown by reference number 345, the BS 110 may transmit the TPC commands to the UE 120. Here, the BS 110 provides the TPC commands using a single 3-bit set of bits. For example, a 3-bit set of bits may indicate 8 possible TPC combinations for the first transmission and the second transmission: {+1:+1, +1:−1, −1:+1, −1:−1, 0:+1, 0:−1, +1:0, −1:0}. A TPC command may not be transmitted when the TPC combination is {0:0}. Other implementations for the TPC command are contemplated. In some aspects, the BS 110 may provide the TPC commands in a control channel, such as downlink control information (DCI) and/or the like. This may provide the configuration of TPC values for both transmissions in a single message, thus conserving processor resources that would otherwise be used to generate multiple messages.

In some aspects, the BS 110 may transmit information identifying a single TPC command (e.g., for either the first transmission or the second transmission). In such a case, the information may be associated with an indicator of whether the TPC command is associated with the first transmission or the second transmission. This may allow for configuration of a single transmission's TPC value, thereby conserving resources that would otherwise be used to transmit information indicating TPC values for both transmissions. In some aspects, the first transmission may be associated with a first DCI frequency, and the second transmission may be associated with a second DCI frequency (e.g., the same as the first DCI frequency or different than the first DCI frequency).

As shown by reference number 350, the UE 120 may determine adjustments to the first transmit power and the second transmit power according to the TPC command. For example, and as shown by reference number 355, the UE 120 may track the first transmit power (e.g., adjustments to the first transmit power) and the second transmit power (e.g., adjustments to the second transmit power) separately. In this case, the UE 120 may determine that the bit map identified in the TPC command (e.g., {−1, 0, +1}) indicates a particular adjustment to the first transmit power and/or the second transmit power, and may apply the particular adjustment to the first transmit power and/or the second transmit power. As shown by reference number 360, the UE 120 may transmit the first transmission with a lower transmit power adjustment (e.g., transmit power−1), and may transmit the second transmission with a higher transmit power adjustment (e.g., transmit power+1). In this way, granular adjustment of the offset between the first transmit power and the second transmit power is enabled.

In some aspects, the BS 110 and/or the UE 120 may perform outer loop link adaptation (OLLA) for the first transmission and/or the second transmission. For example, in OLLA, the BS 110 may select an appropriate modulation and coding scheme (MCS) for a communication based at least in part on a channel quality indicator (CQI) (e.g., for downlink communications) or an estimated SINR (e.g., for uplink communications) and a BLER target. Further, the BS 110 may apply a correction factor for choosing MCS based at least in part on keeping track of previous acknowledgments (ACKs) or negative ACKs (NACKs) in the uplink and the downlink, based at least in part on calculating observed long-term BLER based at least in part on previous ACKs/NACKs, and based at least in part on adjusting the correction factor to achieve the BLER target.

In the case of URLLC, when different BLER targets might be used for the first transmission and the second transmission, different link adaptation may be used for the first transmission than for the second transmission. For example, a mapping table from CQI or SINR to MCS can be different for the first transmission than for the second transmission. Additionally, or alternatively, the correction factor and the corresponding outer loops for MCS selection can be different for the first transmission than for the second transmission. In this way, OLLA for two or more URLLC HARQ transmissions based at least in part on respective BLER targets of the transmissions may be achieved.

Several examples of TPC command combinations for a first transmission and a second transmission are described in turn below. In some aspects, the TPC command combinations described herein may be based at least in part on an observed uplink SINR, an interference over thermal value, a targeted BLER, and/or the like.

As a first example, consider TPC commands of +1,+1, indicating to increase transmit power for the first transmission and the second transmission by 1 dB. In some aspects, this could be due to increased average interference across a bandwidth of the UE 120 or a larger path loss (PL) to a serving cell.

As a second example, consider TPC commands of −1,−1, indicating to decrease transmit power for the first transmission and the second transmission by 1 dB. In some aspects, this could be due to decreased average interference across a bandwidth of the UE 120 or a smaller PL to a serving cell.

As a third example, consider TPC commands of −1,0 (e.g., with a non-fixed delta), indicating to decrease transmit power of the first transmission and not to change a transmit power of the second transmission. This may be due to an observation at the BS 110 that the first BLER (of the first transmission) is now smaller than a targeted first BLER of the first transmission. At the same time, the BS 110 may want to be conservative by not reducing transmit power of the second transmission (e.g., due to a change in modulation order and/or the like). Thus, a different delta between the first transmission and the second transmission may achieve the first BLER and second BLER targets.

As a fourth example, consider TPC commands of +1,0, indicating to increase a transmit power of the first transmission and not to change a transmit power for the second transmission. This could be due to lower variation in interference across resource blocks (RBs). For example, the BS 110 can generally allocate RBs with less interference to the second transmission. Therefore, if variations of interference become smaller, then a smaller delta is needed between the first transmission and the second transmission to achieve a first BLER target and a second BLER target.

This could also be due to a change in BLER targets at the BS 110. For example, the change can be a result of a better operating point based at least in part on decisions at the BS 110. As an example, a strong correlation between first transmission and second transmission failure observed for a UE 120 may indicate a need to decrease a first BLER target and increase a second BLER target. Thus, the BS 110 may change a first and second BLER target of 10e-2,10e-4 to 10e-3,10e-3.

In some aspects, a set of power control parameters described herein may include a first part and a second part. The first part may comprise one or more open-loop power control parameters and the second part may comprise a transmit power control (TPC) command based at least in part on the open-loop power control parameters. For example, the first part may be received or provided using RRC signaling and the second part may be received or provided using DCI (e.g., dynamic) signaling.

As indicated above, FIGS. 3A and 3B are provided as one or more examples. Other examples may differ from what is described with respect to FIGS. 3A and 3B.

Figure 4:
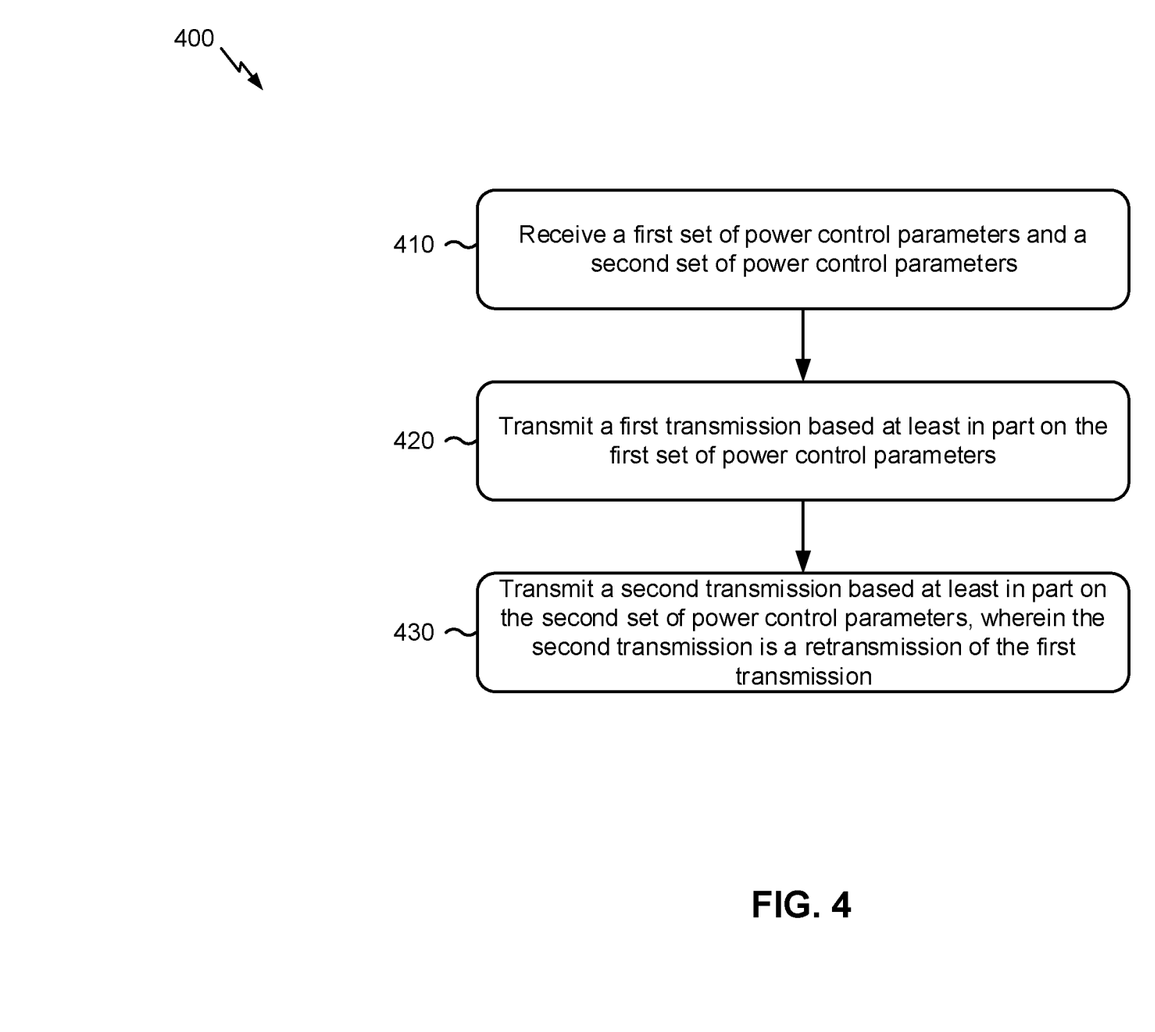
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120) performs dual-loop uplink power control for URLLC HARQ transmissions.

As shown in FIG. 4, in some aspects, process 400 may include receiving a first set of power control parameters and a second set of power control parameters (block 410). For example, the UE may receive (e.g., using antenna 252, DEMOD 254, MIMO detector 256, receive processor 258, controller/processor 280, and/or the like) a first set of power control parameters and a second set of power control parameters from a base station (e.g., BS 110 and/or the like). In some aspects, the power control parameters may be OLPC parameters. In some aspects, the power control parameters may be CLPC parameters, such as TPC commands. The first set of power control parameters may be associated with a first URLLC HARQ transmission and the second set of power control parameters may be associated with a second URLLC HARQ transmission.

As shown in FIG. 4, in some aspects, process 400 may include transmitting a first transmission based at least in part on the first set of power control parameters (block 420). For example, the UE may transmit (e.g., using controller/processor 280, transmit processor 264, TX MIMO processor 266, MOD 254, antenna 252, and/or the like) a first transmission based at least in part on the first set of power control parameters. In some aspects, the UE may determine a transmit power for the first transmission based at least in part on the first set of power control parameters. For example, the UE may determine a transmit power based at least in part on an OLPC parameter. Additionally, or alternatively, the UE may determine a transmit power based at least in part on a CLPC parameter, such as a TPC command.

As shown in FIG. 4, in some aspects, process 400 may include transmitting a second transmission based at least in part on the second set of power control parameters, wherein the second transmission is a retransmission of the first transmission (block 430). For example, the UE may transmit (e.g., using controller/processor 280, transmit processor 264, TX MIMO processor 266, MOD 254, antenna 252, and/or the like) a second transmission based at least in part on the second set of power control parameters. In some aspects, the second transmission may be a retransmission of the first transmission. For example, the second transmission may be a URLLC HARQ retransmission of the first transmission.

Process 400 may include additional aspects, such as any single aspect and/or any combination of aspects described below and/or in connection with one or more other processes described elsewhere herein.

In some aspects, the first set of power control parameters and the second set of power control parameters are configured to achieve a particular transmission power difference between a transmit power of the first transmission and a transmit power of the second transmission. In some aspects, the first transmission and the second transmission are associated with an ultra-reliable low latency communication (URLLC) hybrid automatic repeat request (HARQ) configuration.

In some aspects, the UE may determine a first transmit power of the first transmission and a second transmit power of the second transmission based at least in part on the first set of power control parameters and the second set of power control parameters, respectively. In some aspects, the second transmit power is higher than the first transmit power. In some aspects, the first set of power control parameters and the second set of power control parameters are received via radio resource control (RRC) signaling.

In some aspects, the first set of power control parameters identify a first transmit power control value and the second set of power control parameters identify a second transmit power control value. In some aspects, the first transmit power control value and the second transmit power control value are configured to achieve a dynamic offset between transmit powers of the first transmission and the second transmission.

In some aspects, the UE may track a first transmit power of the first transmission separately from a second transmit power of the second transmission, wherein the first transmit power and the second transmit power are based at least in part on accumulation of the first set of power control parameters and the second set of power control parameters. In some aspects, the first set of power control parameters and the second set of power control parameters are received with information indicating that the first set of power control parameters are associated with the first transmission and the second set of power control parameters are associated with the second transmission. In some aspects, the first set of power control parameters and the second set of power control parameters are received in a message using a single set of bits.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
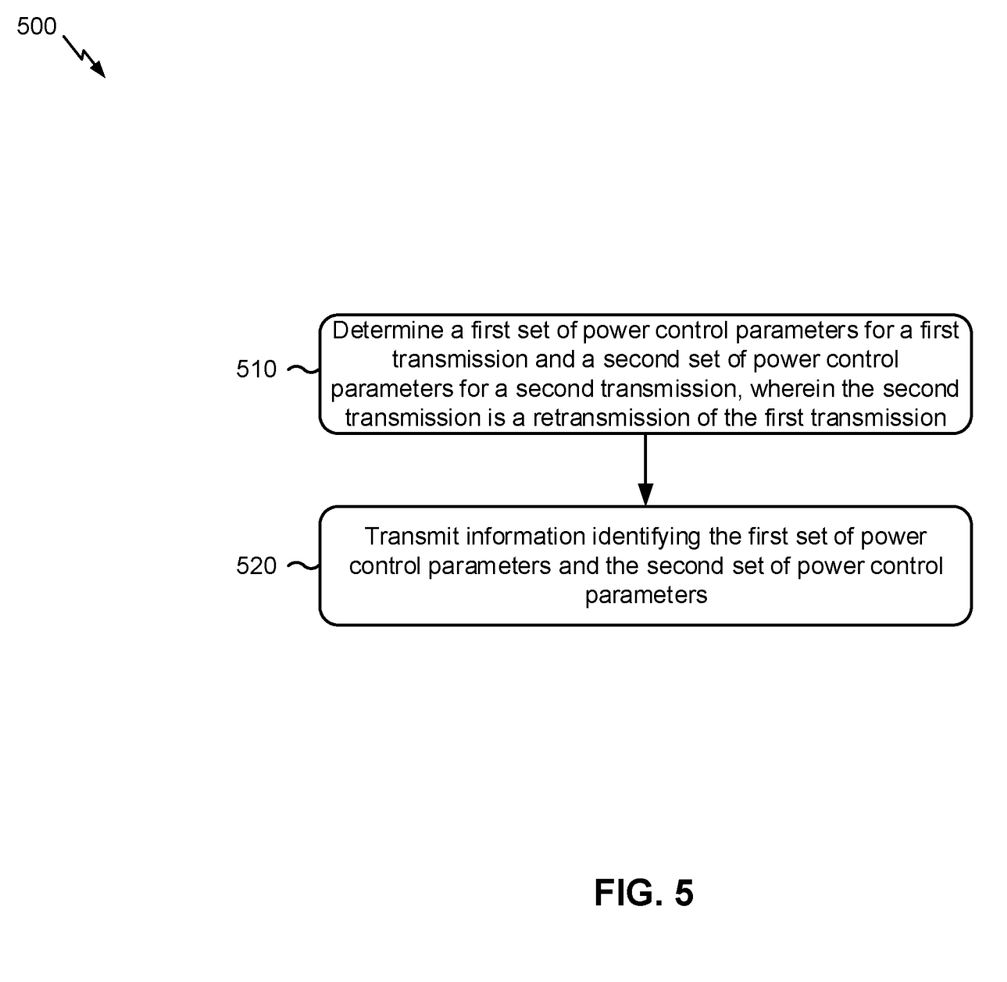
FIG. 5 is a diagram illustrating an example process performed, for example, by a base station, in accordance with various aspects of the present disclosure.

FIG. 5 is a diagram illustrating an example process 500 performed, for example, by a BS, in accordance with various aspects of the present disclosure. Example process 500 is an example where a BS (e.g., BS 110) performs dual-loop uplink power control for URLLC HARQ transmissions.

As shown in FIG. 5, in some aspects, process 500 may include determining a first set of power control parameters for a first transmission and a second set of power control parameters for a second transmission, wherein the second transmission is a retransmission of the first transmission (block 510). For example, the BS may determine (e.g., using controller/processor 240 and/or the like) a first set of power control parameters and a second set of power control parameters. The first set of power control parameters (e.g., an OLPC parameter, a TPC command, etc.) may be for a first transmission. The second set of power control parameters (e.g., an OLPC parameter, a TPC command, etc.) may be for a second transmission. The second transmission may be a retransmission of the first transmission. In some aspects, the first set of power control parameters may be determined based at least in part on a first power control loop and the second set of power control parameters may be determined based at least in part on a second power control loop different than the first power control loop.

As shown in FIG. 5, in some aspects, process 500 may include transmitting information identifying the first set of power control parameters and the second set of power control parameters (block 520). For example, the BS may transmit (e.g., using controller/processor 240, transmit processor 220, TX MIMO processor 230, MOD 232, antenna 234, and/or the like) information identifying the first set of power control parameters and the second set of power control parameters. In some aspects, the BS may transmit the information to a UE. The UE may transmit the first transmission based at least in part on the first set of power control parameters, and may transmit the second transmission (if necessary) based at least in part on the second set of power control parameters.

Process 500 may include additional aspects, such as any single aspect and/or any combination of aspects described below and/or in connection with one or more other processes described elsewhere herein.

In some aspects, the first set of power control parameters and the second set of power control parameters comprise open loop power control parameters. In some aspects, the first set of power control parameters and the second set of power control parameters are configured to achieve a particular transmission power difference between a transmit power of the first transmission and a transmit power of the second transmission. In some aspects, the first set of power control parameters are determined based at least in part on a target signal quality for the first transmission and the second set of power control parameters are determined based at least in part on a target signal quality for the second transmission.

In some aspects, the first transmission and the second transmission are associated with an ultra-reliable low latency communication (URLLC) hybrid automatic repeat request (HARD) configuration. In some aspects, the information identifying the first set of power control parameters and the second set of power control parameters is transmitted with information indicating that the first set of power control parameters are associated with the first transmission and the second set of power control parameters are associated with the second transmission. In some aspects, the information identifying the first set of power control parameters and the second set of power control parameters is transmitted in a message using a single set of bits.

In some aspects, the BS may determine a first outer loop link adaptation (OLLA) value for the first transmission and a second OLLA value for the second transmission. In some aspects, the first OLLA value is determined based at least in part on a first error rate target for the first transmission and the second OLLA value is determined based at least in part on a second error rate target for the second transmission. In some aspects, a mapping table for the first OLLA value is different than a mapping table for the second OLLA value. In some aspects, a correction factor for the first OLLA value is different than a correction factor for the second OLLA value. In some aspects, the first OLLA value is determined based at least in part on a first outer loop and the second OLLA value is determined based at least in part on a second outer loop. In some aspects, the first set of power control parameters and the second set of power control parameters are determined based at least in part on at least one of an observed uplink signal-to-interference-plus-noise (SINR) ratio, an interference over thermal value, or a target block error rate.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations are contemplated in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of aspects. In fact, many of these features may be combined in ways not specifically recited in the claims and/or disclosed in the specification. Although each dependent claim listed below may directly depend on only one claim, the disclosure of aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
  receiving a first set of power control parameters and a second set of power control parameters,
    wherein the first set of power control parameters and the second set of power control parameters are received in a single message;
  transmitting, using a first block error rate (BLER) target, a first transmission based at least in part on the first set of power control parameters,
    wherein the first set of power control parameters comprise one or more first open-loop power control (OLPC) parameters; and
  transmitting, using a second BLER target, a second transmission based at least in part on the second set of power control parameters,
    wherein the second transmission is a retransmission of the first transmission,
    wherein the second set of power control parameters comprise one or more second OLPC parameters,
    wherein the one or more first OLPC parameters are different from the one or more second OLPC parameters, and
    wherein the second BLER target is different from the first BLER target.

2. The method of claim 1, wherein the first set of power control parameters and the second set of power control parameters are configured to achieve a particular transmission power difference between a transmit power of the first transmission and a transmit power of the second transmission.

3. The method of claim 1, wherein the first transmission and the second transmission are associated with an ultra-reliable low latency communication (URLLC) hybrid automatic repeat request (HARQ) configuration.

4. The method of claim 1, wherein the first set of power control parameters identify a first transmit power control value and the second set of power control parameters identify a second transmit power control value.

5. The method of claim 1, wherein the first set of power control parameters and the second set of power control parameters are received with information indicating that the first set of power control parameters are associated with the first transmission and the second set of power control parameters are associated with the second transmission.

6. The method of claim 1, wherein the first set of power control parameters and the second set of power control parameters are received in a message using a single set of bits.

7. The method of claim 1, wherein the first set of power control parameters comprises a first part and a second part,
  wherein the first part comprises the one or more first OLPC parameters, and
  wherein the second part comprises a transmit power control (TPC) command based at least in part on the one or more first OLPC parameters.

8. The method of claim 7, wherein the first part is received using radio resource control (RRC) signaling, and wherein the second part is part of the first set of power control parameters and the second set of power control parameters.

9. The method of claim 7, further comprising:
  tracking a first transmit power of the first transmission separately from a second transmit power of the second transmission,
    wherein the first transmit power and the second transmit power are based at least in part on accumulation of the second part of the first set of power control parameters and the second set of power control parameters.

10. A method of wireless communication performed by a base station, comprising:
  determining a first set of power control parameters for a first transmission of a user equipment (UE) in an uplink and a second set of power control parameters for a second transmission of the UE in the uplink,
    wherein the first transmission is transmitted using a first block error rate (BLER) target,
    wherein the second transmission is transmitted using a second block error rate (BLER) target,
    wherein the second BLER target is different from the first BLER target,
    wherein the second transmission is a retransmission of the first transmission, and
    wherein the first set of power control parameters are determined based at least in part on a first power control loop and the second set of power control parameters are determined based at least in part on a second power control loop different than the first power control loop,
wherein the first set of power control parameters comprise one or more first open-loop power control (OLPC) parameters,
wherein the second set of power control parameters comprise one or more second OLPC parameters, and
wherein the one or more first OLPC parameters are different from the one or more second OLPC parameters; and
transmitting information identifying the first set of power control parameters and the second set of power control parameters,
wherein the information identifying the first set of power control parameters and the second set of power control parameters is transmitted in a single message.

11. The method of claim 10, wherein the first set of power control parameters and the second set of power control parameters are configured to achieve a particular transmission power difference between a transmit power of the first transmission and a transmit power of the second transmission.

12. The method of claim 10, wherein the first set of power control parameters are determined based at least in part on a target signal quality for the first transmission and the second set of power control parameters are determined based at least in part on a target signal quality for the second transmission.

13. The method of claim 10, wherein the first transmission and the second transmission are associated with an ultra-reliable low latency communication (URLLC) hybrid automatic repeat request (HARQ) configuration.

14. The method of claim 10, wherein the information identifying the first set of power control parameters and the second set of power control parameters is transmitted with information indicating that the first set of power control parameters are associated with the first transmission and the second set of power control parameters are associated with the second transmission.

15. The method of claim 10, wherein the first set of power control parameters comprises a first part and a second part,
wherein the first part comprises the one or more first OLPC parameters, and
wherein the second part comprises a transmit power control (TPC) command based at least in part on the one or more first OLPC parameters.

16. The method of claim 15, further comprising:
tracking a first transmit power of the first transmission separately from a second transmit power of the second transmission,
wherein the first transmit power and the second transmit power are based at least in part on accumulation of the second part of the first set of power control parameters and the second set of power control parameters.

17. The method of claim 15, wherein the first part is transmitted using radio resource control (RRC) signaling, and wherein the second part is part of the information identifying the first set of power control parameters and the second set of power control parameters.

18. A user equipment (UE) for wireless communication, comprising:
a memory; and
one or more processors operatively coupled to the memory, the memory and the one or more processors configured to:
receive a first set of power control parameters and a second set of power control parameters,
wherein the first set of power control parameters and the second set of power control parameters are received in a single message;
transmit, using a first block error rate (BLER) target, a first transmission based at least in part on the first set of power control parameters,
wherein the first set of power control parameters comprise one or more first open-loop power control (OLPC) parameters; and
transmit, using a second BLER target, a second transmission based at least in part on the second set of power control parameters,
wherein the second transmission is a retransmission of the first transmission,
wherein the second set of power control parameters comprise one or more second OLPC parameters,
wherein the one or more first OLPC parameters are different from the one or more second OLPC parameters, and
wherein the second BLER target is different from the first BLER target.

19. The UE of claim 18, wherein the first set of power control parameters and the second set of power control parameters are configured to achieve a particular transmission power difference between a transmit power of the first transmission and a transmit power of the second transmission.

20. The UE of claim 18, wherein the first transmission and the second transmission are associated with an ultra-reliable low latency communication (URLLC) hybrid automatic repeat request (HARQ) configuration.

21. The UE of claim 18, wherein the first set of power control parameters identify a first transmit power control value and the second set of power control parameters identify a second transmit power control value.

22. The UE of claim 18, wherein the one or more processors are further configured to:
track a first transmit power of the first transmission separately from a second transmit power of the second transmission,
wherein the first transmit power and the second transmit power are based at least in part on accumulation of the first set of power control parameters and the second set of power control parameters.

23. The UE of claim 18, wherein the first set of power control parameters comprises a first part and a second part,
wherein the first part comprises the one or more first OLPC parameters, and
wherein the second part comprises a transmit power control (TPC) command based at least in part on the one or more first OLPC parameters.

24. The UE of claim 23, wherein the first part is received using radio resource control (RRC) signaling, and wherein the second part is the part of the first set of power control parameters and the second set of power control parameters.

25. The UE of claim 18, wherein the second set of power control parameters comprises a first part and a second part,
wherein the first part comprises one or more the one or more second OLPC parameters, and
wherein the second part comprises a transmit power control (TPC) command based at least in part on the one or more second OLPC parameters.

26. The UE of claim 25, wherein the first part is received using radio resource control (RRC) signaling, and wherein the second part is part of the first set of power control parameters and the second set of power control parameters.

27. A base station for wireless communication, comprising:
 a memory; and
 one or more processors operatively coupled to the memory, the memory and the one or more processors configured to:
  determine a first set of power control parameters for a first transmission of a user equipment (UE) in an uplink and a second set of power control parameters for a second transmission of the UE in the uplink,
   wherein the first transmission is transmitted using a first block error rate (BLER) target,
   wherein the second transmission is transmitted using a second block error rate (BLER) target,
   wherein the second BLER target is different from the first BLER target,
   wherein the second transmission is a retransmission of the first transmission, and
   wherein the first set of power control parameters are determined based at least in part on a first power control loop and the second set of power control parameters are determined based at least in part on a second power control loop different than the first power control loop,
   wherein the first set of power control parameters comprise one or more first open-loop power control (OLPC) parameters,
   wherein the second set of power control parameters comprise one or more second OLPC parameters, and
   wherein the one or more first OLPC parameters are different from the one or more second OLPC parameters; and
  transmit information identifying the first set of power control parameters and the second set of power control parameters,
   wherein the information identifying the first set of power control parameters and the second set of power control parameters is transmitted in a single message.

28. The base station of claim 27, wherein the first set of power control parameters and the second set of power control parameters are configured to achieve a particular transmission power difference between a transmit power of the first transmission and a transmit power of the second transmission.

29. The base station of claim 27, wherein the first transmission and the second transmission are associated with an ultra-reliable low latency communication (URLLC) hybrid automatic repeat request (HARQ) configuration.

30. The base station of claim 27, wherein the first set of power control parameters comprises a first part and a second part,
 wherein the first part comprises the one or more first OLPC parameters, and
 wherein the second part comprises a transmit power control (TPC) command based at least in part on the one or more first OLPC parameters.

\* \* \* \* \*